2,850,479

PROCESS OF PREPARING AN ACRYLONITRILE GRAFT INTERPOLYMER

David B. Capps, Decatur, Ala., assignor to The Chemstrand Corporation, Decatur, Ala., a corporation of Delaware No Drawing. Application August 8, 1955
Serial No. 527,173

6 Claims. (Cl. 260—45.5)

This invention relates to a novel method of preparing acrylonitrile polymers useful in the fabrication of general purpose synthetic fibers. More particularly, it relates to the method of preparing acrylonitrile polymers characterized by increased dye-receptivity and increased solubility in organic solvents.

It is known to the art that copolymers of 85 or more percent of acrylonitrile and up to 15 percent of other polymerizable monomers are capable of fabrication into high tenacity fibers with good chemical and physical properties. These copolymers and especially those of acrylonitrile and alkyl acrylates, alkyl methacrylates, vinyl carboxylates, vinyl or isopropenyl aromatic hydrocarbons, and methacrylonitrile are not sufficiently dye-receptive to enable their use in the preparation of general purpose fibers.

It is also known that the dye-receptivity of polyacrylonitrile can be improved by copolymerizing a vinylpyridine with acrylonitrile. This method of the compositions thereof have not met with commercial success for a number of reasons, most important of which is the difficulty of controlling the vinylpyridine content of the polymer so as to prepare uniform products, and the dark color introduced by the vinylpyridine when used in quantities sufficient to increase the dyeability to a practical degree. It is also known that the non-dyeable polymers may be rendered dye-receptive if they are blended with a sufficient quantity of a vinylpyridine copolymer. This method of increasing the dyeability of acrylonitrile polymers is likewise subject to the disadvantage of poor color when sufficient vinylpyridine is present to increase dye-receptivity to a practical degree, and difficulty of control of vinylpyridine content.

It is also known that modified copolymers of polymerized vinylpyridines and acrylonitrile in which the vinylpyridine monomers are first polymerized and are subsequently further polymerized with acrylonitrile afford copolymers of greater dye-receptivity and improved solubility in organic solvents. The difficulties in the use of such modified so-called "grafted" copolymers lie in carrying out the second polymerization in a medium in which the "backbone" polymer is homogeneously dispersed. It has been proposed to form these modified or "graft" copolymers by means of an emulsion polymerization. This method of polymerization has been considered necessary because of the virtual insolubility of polyvinylpyridines in water. This method poses many difficulties in obtaining an homogeneous dispersion from two separate emulsion phases and for stabilizing the emulsion during the polymerization of the acrylonitrile monomer onto the polyvinylpyridine "backbone" polymer. It has also been proposed to carry out the step of "graft" polymerizing acrylonitrile onto a polyvinylpyridine "backbone" polymer by means of polymerizing in an acidic solution. This method, though an improvement over the emulsion procedure described above, still retains disadvantages of the necessity of a pH adjustment before conducting the second polymerization step and the corrosion problems inherent in carrying out a reaction under acidic conditions.

The primary purpose of this invention is the preparation of oriented acrylonitrile polymers readily susceptible of being dyed with conventional dyes. A further purpose is to provide a novel procedure for preparing fiber-spinning modified acrylonitrile polymers of superior properties by graft polymerizing in a non-acidified solution of the "backbone" copolymer. A more specific purpose is to provide such a novel procedure which does not require adjustment of the pH of the polymerization medium during the course of preparation of the polymer. A further purpose is the provision of a method for preparing acrylonitrile polymers which are readily dyed by conventional dyes and which have increased solubility in organic solvents to give clear solutions. Other objects will appear from the description of the invention hereinafter.

In general, the objects of the invention are accomplished by the production of modified acrylonitrile interpolymers containing from 85 to 98 percent by weight of the polymer of a composition comprising at least 85 percent acrylonitrile and up to 15 percent of another mono-olefinic monomer copolymerizable therewith copolymerized in the presence of a preformed copolymer of from 25 to 75 percent by weight of a vinylpyridine and from 75 to 25 percent of acrylic acid, said interpolymer being so prepared as to provide from two to ten percent of the vinylpyridine in polymeric form in the modified interpolymer.

While I have chosen to refer to the compositions of this invention as modified interpolymers, a more descriptive term might be "graft interpolymers." In accordance with the process of this invention a "backbone" copolymer of a vinylpyridine and acrylic acid is first prepared, and the units of a monomeric composition comprising at least 85 percent of acrylonitrile and up to 15 percent of another mono-olefinic monomer copolymerizable therewith are then polymerized in the presence of this copolymer so that in effect the monomer units are grafted onto the backbone copolymer. The copolymer of from 25 to 75 percent of a vinylpyridine and from 75 to 25 percent of acrylic acid can be prepared by bulk, suspension, solution, or emulsion procedures, but the preferred method is by solution polymerization.

The vinylpyridine and acrylic acid copolymer solution employed as the backbone copolymer in accordance with this invention is separately prepared by polymerizing from 25 to 75 percent of a vinylpyridine with from 75 to 25 percent of acrylic acid. Vinylpyridines includes within the contemplation of the invention are those having the formula

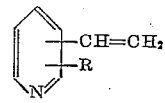

wherein R is selected from the group consisting of hydrogen and an alkyl radical containing from one to four carbon atoms. Examples of suitable vinylpyridines include 2-vinylpyridine, 3-vinylpyridine, 4-vinylpyridine, 2-methyl-5-vinylpyridine, 3-methyl-5-vinylpyridine, 2-vinyl-5-ethylpyridine, and so forth.

In accordance with the preferred procedure for preparing the compositions of this invention, the copolymer of a vinylpyridine and acrylic acid is first polymerized in water solution in the presence of a polymerization catalyst which results in a water solution of the desired copolymer. After polymerization of the backbone copolymer is substantially complete the monomeric acrylonitrile composition is then polymerized in the presence of the backbone copolymer, together with suitable catalysts, and polymerization continued until completion yielding a slurry of the modified acrylonitrile interpolymer.

As previously indicated, the polymerization of the vinylpyridine and the acrylic acid is accomplished by a solution polymerization process wherein no emulsifying agents or emulsion stabilizers are required. The polymerization results in an aqueous solution of the desired backbone copolymer. Thus, the further polymerization of the monomeric composition of acrylonitrile and a copolymerizable mono-olefinic monomer can be accomplished by polymerization procedures which do not require emulsifiers or emulsion stabilizers, since the backbone copolymer is dissolved in the polymerization meduim. This method of producing the compositions of the invention is very expedient and constitutes a distinct advantage of the instant invention.

Copolymerization of the vinylpyridine and acrylic acid is catalyzed by means of any water-soluble peroxy compound, for example, sodium peroxide, hydrogen peroxide, potassium persulfate, sodium percarbonate, sodium perborate, and the alkali metal and ammonium salts of the same and other peroxy acids, and any other water-soluble compound containing a peroxy group. A wide variation in the quantity of peroxy compound is possible. For example, from 0.3 to 1.5 percent of the weight of the vinylpyridine and acrylic acid may be used. The so-called redox catalyst system may also be used, for example, potassium peroxy disulfate and sodium bisulfite. The catalyst may be charged at the outset of the reaction, or it may be added continuously, or in increments, throughout the reaction for the purpose of maintaining a more uniform concentration of catalyst in the reaction mass. The latter method is preferred because it tends to make the resultant copolymer more uniform in its chemical and physical properties.

The preferred procedure for preparing the copolymer of a vinylpyridine and acrylic acid utilizes a solution polymerization which is conducted at reflux temperature, i. e., 95–100° C. The reagents may be combined by a wide variety of methods. In general, the monomers and catalysts are charged gradually to the reaction vessel containing water which is maintained at temperatures of approximately that of the reflux.

Upon substantial completion of the copolymerization, the reaction is stopped by cooling the mass substantially below the reflux temperature. If more than about five percent of unreacted vinylpyridine monomer remains, the excess may be removed by steam distillation. Preferably, the polymerization reaction is continued until less than about five percent of monomer remains, making a steam distillation unnecessary.

The aqueous solution of backbone copolymer described above is then employed in the polymerization of fiber-forming acrylonitrile polymers. The monomeric composition graft polymerized onto this preformed copolymer may consist solely of acrylonitrile. The acrylonitrile, however, may be polymerized conjointly with other monomers, for example, styrene, vinyl chloride, vinyl acetate, and vinylidene chloride. This polymerization requires only the addition of a "free radical" type of catalyst, for example, water-soluble peroxy catalyst such as the alkali metal and ammonium persulfates or the alkali metal and ammonium salts of other peroxy acids, such as percarbonic acid and perboric acid. Azo catalysts such as the alpha, alpha'-azodiisobutyronitrile may also be employed. The preferred practice involves the use of from 0.1 to 2.0 percent of the catalyst.

If desired, "redox" agents may be present in the reaction mixture. These are generally compounds in a lower valence state which are readily oxidized to the higher valence state under the conditions of reaction. Through the use of this oxidation-reduction system, it is possible to obtain polymerization to a substantial extent at lower temperatures than otherwise would be required. The use of lower temperatures thereby enables the preparation of more color-free polymers, since the high temperatures favor the formation of the colored bodies. Suitable "redox" agents are sulfur dioxide, the alkali metal and ammonium bisulfites, and sodium formaldehyde sulfoxylate.

The polymerization of the monomeric acrylonitrile composition may involve the use of emulsifying or dispersing agents, if desired, although these are not essential. Suitable dispersing agents are the substances which have both hydrophobic and hydrophilic substituents and which prevent the agglomeration of the polymer particles, thus insuring a finely divided but readily separable polymer.

If desired, the polymerization may be effected in the presence of regulators, which substances are chain terminators whereby the polymer molecular weights are more uniform. This additional factor of uniformity is desirable for the preparation of optimum synthetic fibers. Suitable regulators for the practice of this invention are tertiary-dodecylmercaptan, mercaptoacetic acid, and other organic compounds containing mercapto substituents. Ordinarily, such regulators are not required.

The following examples will serve to illustrate further the manner whereby this invention is practiced.

*Example I*

A copolymer of 2-methyl-5-vinylpyridine and acrylic acid was prepared by adding a mixture of 119 grams of 2-methyl-5-vinylpyridine and 72 grams of acrylic acid to a stirred, heated reactor, containing 390 ml. of water over a period of 90 minutes, at reflux temperature. Separate solutions containing 3.8 grams of potassium peroxydisulfate and 1.9 grams of sodium bisulfite, each in 90 ml. of water, were added, simultaneously and continuously, over this period. The resulting aqueous solution of copolymer was freed of unreacted 2-methyl-5-vinylpyridine monomer by steam distillation.

*Example II*

A stirred, heated reactor containing 1,930 ml. of water was brought to reflux temperature. There was then added to the reactor over a period of 120 minutes 255 grams of the polymer solution of Example I, a solution of 7.7 grams of ammonium peroxydisulfate in 120 ml. of water, and 384 grams of acrylonitrile, as separate streams, simultaneously and continuously. The contents of the reactor were maintained at reflux temperatures. The resulting polymer slurry was freed of unreacted acrylonitrile monomer by steam distillation. The polymer, after isolation, washing, and drying, weighed 376 grams, and contained 5.5 percent of 2-methyl-5-vinylpyridine.

A spinning solution of this polymer in N,N-dimethylacetamide was prepared at 70° C. Fibers spun from this solution by wet spinning techniques possessed excellent physical properties and were readily dyed with acid dyes.

*Example III*

A stirred, heated reactor containing 1,060 ml. of water was brought to reflux temperature. There was then added to the reactor over a period of 60 minutes 87 grams of a solution containing 30 grams of the copolymer of Example I containing 38 percent acrylic acid and 62 percent 2-methyl-5-vinylpyridine. Simultaneously and continuously there was added a solution of 0.85 grams of potassium peroxydisulfate in 120 ml. of water, a solution of 0.85 grams of sodium bisulfite in 120 ml. of water and 170 grams of acrylonitrile as separate streams. The contents of the reactor were maintained at reflux temperatures throughout the addition period of 60 minutes and for an additional period of 15 minutes. The resulting polymer slurry was then freed of unreacted acrylonitrile monomer by steam distillation. The polymer, after isolation, washing, and drying, weighed 250 grams, and was found to contain 5 percent of 2-methyl-5-vinylpyridine upon analysis.

A sample of the polymer was dissolved in N,N-dimethylacetamide and cast into a film. The film, freed of solvent, was found to dye readily to good scarlet shade with Wool Fast Scarlet in an acidic dyebath.

The present invention affords a convenient and expedient method for producing acrylonitrile graft interpolymers of increased dyeability which does not require the use of a difficultly controlled, emulsion stabilized polymerization. The process of this invention utilizes a backbone copolymer which is soluble in the aqueous polymerization medium without the necessity of a pH adjustment, and hence all problems of dispersion and stabilization are avoided as well as those of corrosion due to the use of acid conditions. Numerous other advantages will be apparent to those skilled in the art.

I claim:

1. A process for preparing an acrylonitrile graft interpolymer which comprises reacting in aqueous solution a monomeric composition consisting of from 25 to 75 percent by weight of a vinylpyridine having the formula,

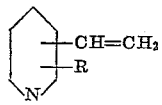

wherein R is selected from the group consisting of hydrogen and an alkyl radical containing from one to four carbon atoms and from 75 to 25 percent by weight of acrylic acid in the presence of a water-soluble peroxy polymerization catalyst by heating the said aqueous solution to approximately reflux temperature until an aqueous solution of a copolymer of the said vinylpyridine and acrylic acid is obtained, contacting the said resulting aqueous solution of the said copolymer with a composition comprising at least 85 percent by weight of acrylonitrile and up to 15 percent by weight of another mono-olefinic monomer copolymerizable therewith in the presence of a polymerization catalyst selected from the group consisting of water-soluble peroxy catalysts and azo catalysts, heating the resulting mixture until the acrlyonitrile composition is polymerized, and separating the resulting graft interpolymer consisting of the said copolymer which has been further polymerized with the said acrylonitrile composition, the said acrylonitrile composition being employed in an amount sufficient to provide from two to ten percent of the said vinylpyridine in polymeric form in the graft interpolymer.

2. The method of claim 1 wherein the vinylpyridine is 2-vinylpyridine.

3. The method of claim 1 wherein the vinylpyridine is 4-vinylpyridine.

4. The method of claim 1 wherein the vinylpyridine is 2-methyl-5-vinylpyridine.

5. The method of claim 1 wherein the vinylpyridine is 2-vinyl-5-ethylpyridine.

6. A process for preparing an acrylonitrile graft interpolymer which comprises polymerizing a monomeric composition consisting of from 25 to 75 percent by weight of a vinylpyridine having the formula,

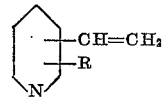

wherein R is selected from the group consisting of hydrogen and an alkyl radical containing from one to four carbon atoms and from 75 to 25 percent by weight of acrylic acid by heating an aqueous solution thereof to approximately the reflux temperature of the said aqueous solution in the presence of a water-soluble peroxy polymerization catalyst, cooling the reaction mixture substantially below reflux temperature upon substantial completion of the polymerization, removing unreacted monomeric vinylpyridine by steam distillation, and thereupon gradually adding to the resulting aqueous solution of the said copolymer a monomeric composition comprising at least 85 percent by weight of acrylonitrile and up to 15 percent by weight of another mono-olefinic monomer copolymerizable therewith, heating the resulting mixture in the presence of a polymerization catalyst selected from the group consisting of water-soluble peroxy catalyst and azo catalysts until the monomeric acrylonitrile composition is polymerized, and separating the resulting graft interpolymer consisting of the said copolymer which has been further polymerized with the said acrylonitrile composition, the said acrylonitrile composition being employed in an amount sufficient to provide from two to ten percent of the said vinylpyridine in polymeric form in the graft interpolymer.

References Cited in the file of this patent

UNITED STATES PATENTS

| | | |
|---|---|---|
| 2,613,194 | Craig | Oct. 7, 1952 |
| 2,620,324 | Coover et al. | Dec. 2, 1952 |